Feb. 13, 1940.   J. A. CAMERON   2,190,539
TWO-WHEEL CAR TRUCK
Filed Feb. 11, 1935   3 Sheets-Sheet 1
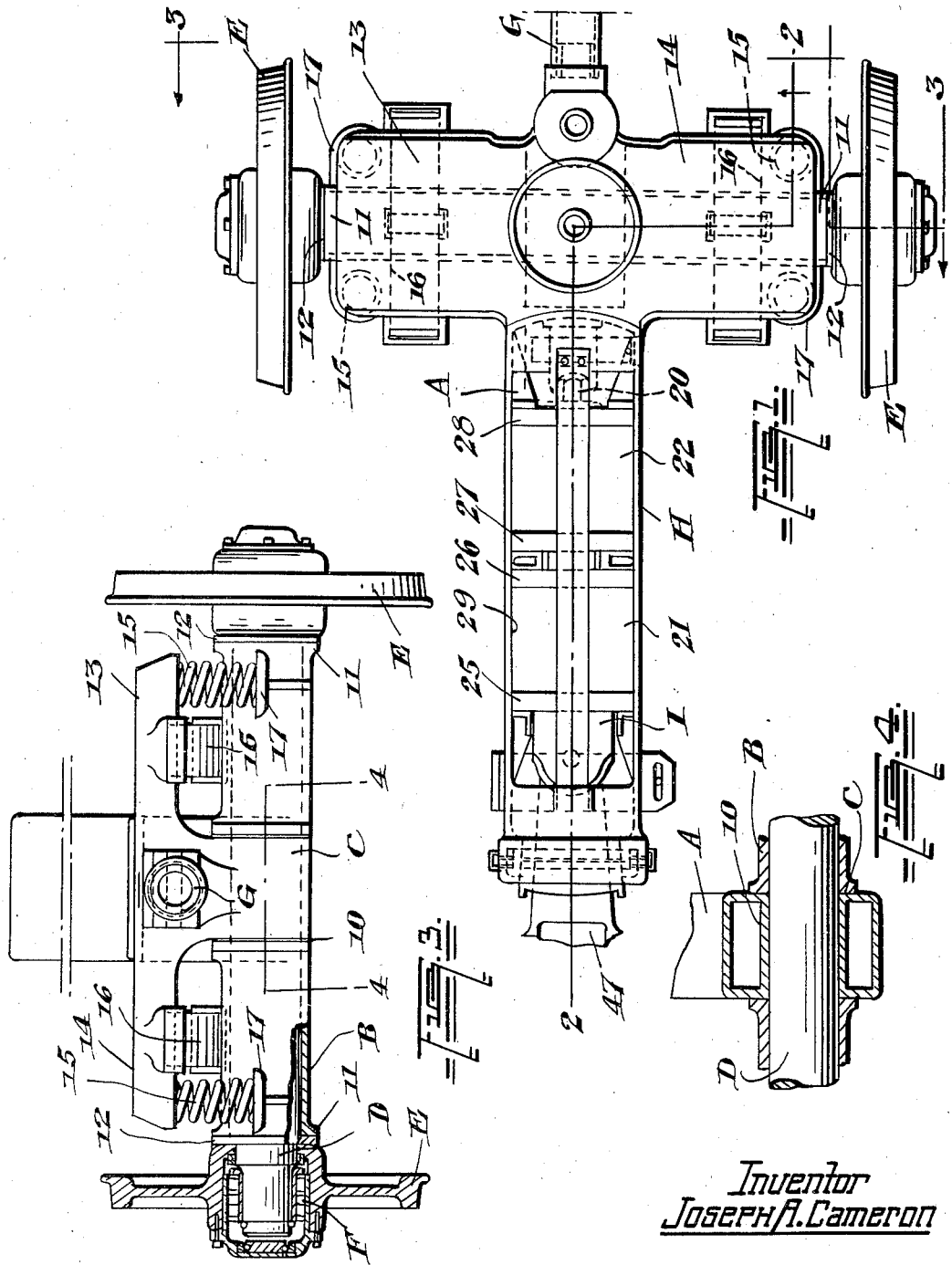
Inventor
Joseph A. Cameron
BY Eugene E. Stevens
Atty.

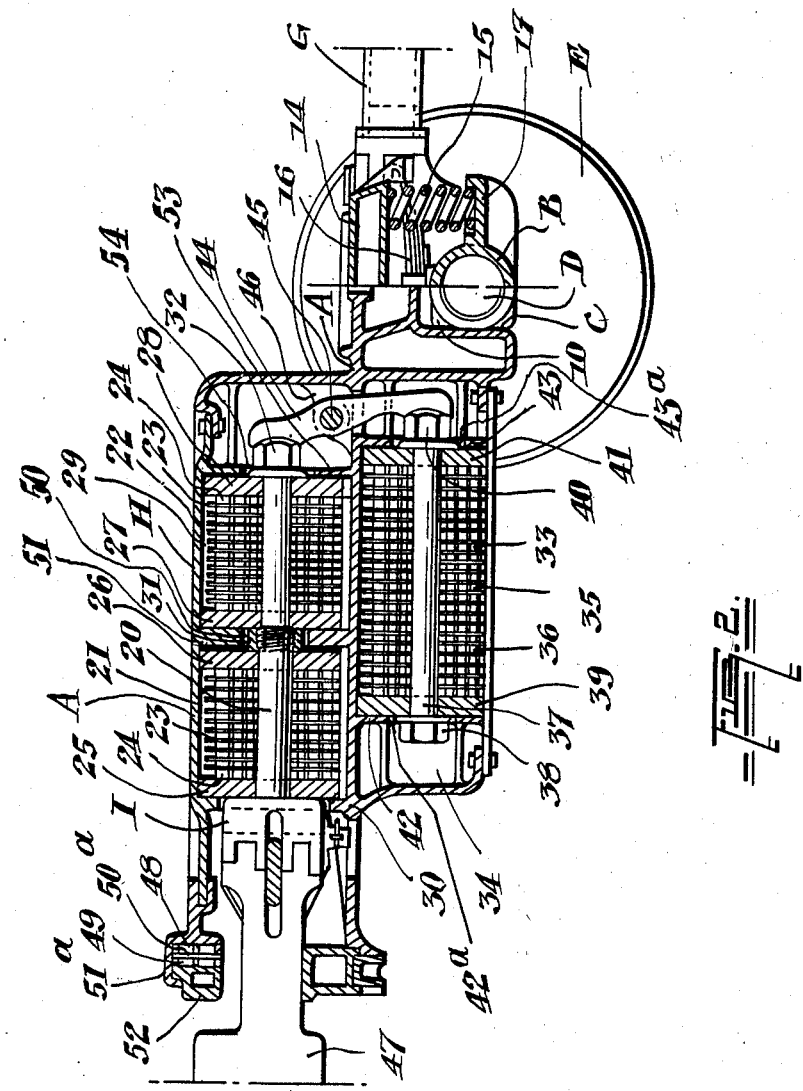

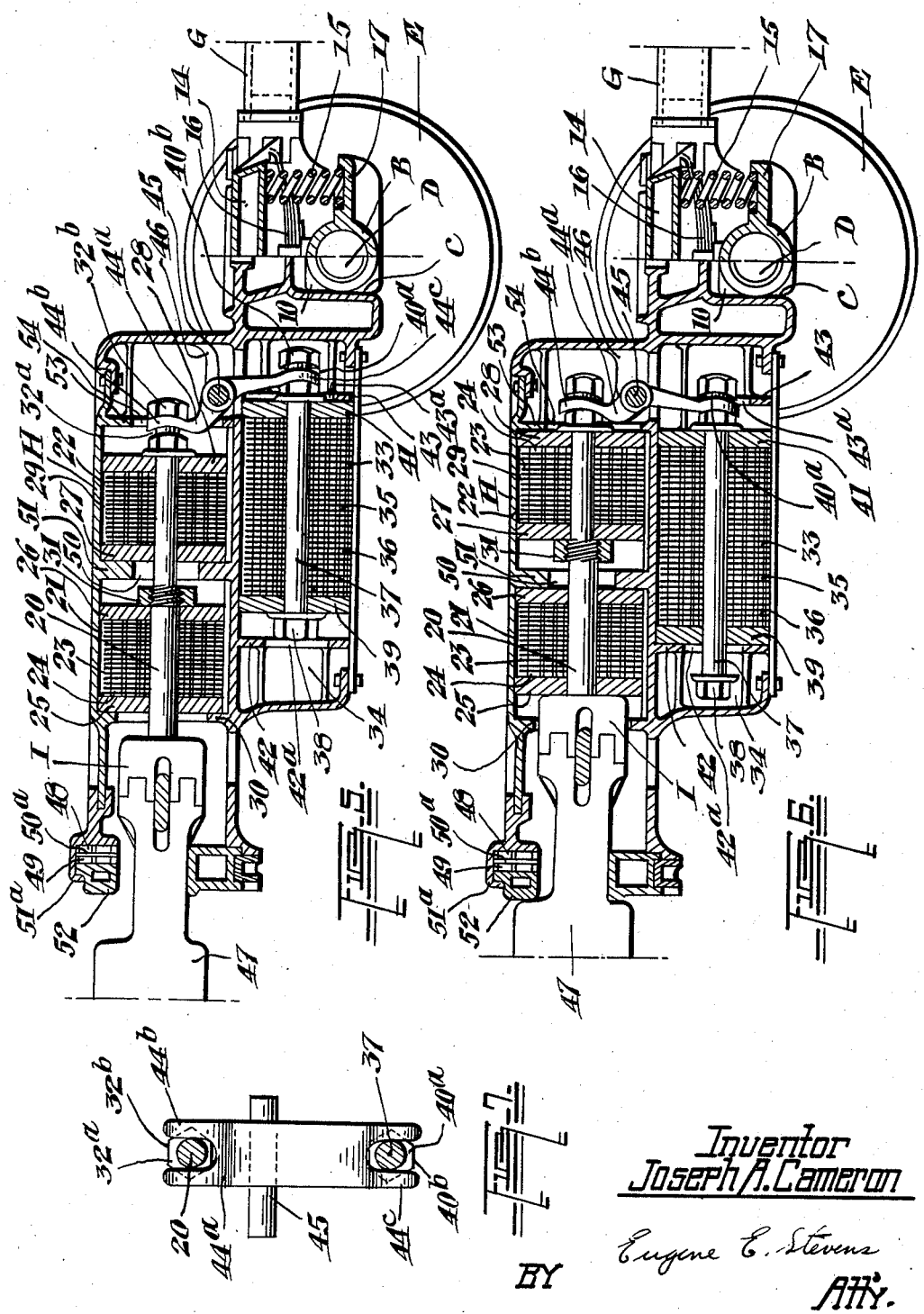

Patented Feb. 13, 1940

2,190,539

UNITED STATES PATENT OFFICE 2,190,539

TWO-WHEEL CAR TRUCK

Joseph Ashmore Cameron, Montreal, Quebec, Canada

Application February 11, 1935, Serial No. 6,057

6 Claims. (Cl. 213—7)

This invention relates to improvements in two wheel car trucks, and the general objects of the invention are to provide a very light and simple form of truck so constructed and arranged as to relieve the car body of buffing and pulling shocks.

Further objects of the invention are to provide increased resistance to buffing shocks and to enable them to be absorbed without danger of damage to either the truck or the car body.

Further objects of the invention are generally to improve and simplify the construction of a truck of this character the better to adapt it to perform the functions required of it.

In this construction the invention includes a T-shaped longitudinally extending member or bolster having supporting members at one end for the car axle, having a draft attachment at the opposite end of special form with means to provide increased resistance for buffing or pulling shocks; all as hereinafter more fully set forth and described in the accompanying specifications and drawings.

In the drawings

Figure 1 is a plan view of a two wheel car truck embodying the present invention.

Figure 2 is a sectional elevation on the line 2—2 of Figure 1.

Figure 3 is a view partially in section and partially in elevation taken along the lines 3—3 of Figure 1.

Figure 4 is a sectional elevation showing a detail on the line 4—4 of Figure 3.

Figure 5 is a sectional elevation of an alternative form of the invention showing the arrangement of parts under a pulling shock.

Figure 6 is the same view as Figure 5 of the parts resisting a buffing shock.

Figure 7 is a fragmentary sectional view showing, in elevation, the connecting lever between the two parts of the shock-resisting mechanism.

In the drawings like characters of reference indicate corresponding parts in all the figures.

Referring to the drawings, A indicates a central longitudinally extending member or bolster, T-shaped in form, conveniently constructed from hollow cast or built up plate metal with reinforced interior webbing. B indicates a car axle housing of tubular form having a squared central portion 10 designed to fit a dependent guideway C on the bolster A and vertically movable therein. The car axle housing is designed to receive the axle D on which the wheels E are mounted, preferably with freedom of independent rotation which may be accomplished through any convenient form of roller bearing F. The ends of the car axle housing are flanged at 11, and bear against washers 12, which in turn bear against the hubs of the wheels.

Suitable spring means extend between the car axle housing and the bolster, these means abutting the underside of the transverse extensions 13 and 14 of the bolster A which forms the head of the T. I prefer to employ both coil springs 15 and elliptical springs 16, but either one of these might be employed alone. Coil springs are conveniently seated on extension lugs 17 formed on the side of the car axle housing.

The inside end of the car truck is provided with convenient draft means such as a connecting rod G which has an articulated or swiveling connection with the bolster and which connects the same either to the bolster of the forward truck or to the coupling element on the rear bolster of the car.

The outside end of the bolster A is provided with a housing H designed to receive the shock absorbing means of a standard swivelled butt coupler I. The construction of this coupler itself does not form a part of the present invention. It is usual to provide cushioning means for the shank of the coupler elements which may be in the form of flat plates separated by rubber sections, or steel springs, or friction draft gear. In the design shown a draft rod 20 is provided connected to the coupling element and extending through two sections 21 and 22, each of which sections comprises a plurality of parallel metal plates 23 separated by rubber rings 24 held together by end follower plates 25, 26, 27 and 28, which are mounted in the cylindrical section 29 of the housing H with freedom of longitudinal movement. The sections 21 and 22 are mounted within a cylindrical portion 29 of the casing H and free to move longitudinally therein, the plate 25 being limited in its outward movement by a lug or flange 30. The rod 20 is provided with a central nut 31 adapted normally to fit between and abut the plates 26 and 27, being free to pass through an aperture 50 in a central abutment plate or lug 51, which abutment plate is adapted to engage the plates 26 and 27. The end plate 28 is adapted to have its movement limited by an end abutment plate or lug 53 having an aperture 54 through which the cap nut 32 may pass. It will be seen that under pulling strain the rubber rings will be compressed by reason of the movement of the plates 26 and 28 with draft rod 20 against the plates 25 and 27, the latter being held by the abutments 30 and 51.

To provide additional cushion resistance to a buffing shock a separate cushioning element 33 is provided mounted in an extension 34 on the under side of the casing, and also comprising a plurality of spaced plates 35 separated by rubber rings 36. A rod 37 extends through all the rings, having a nut 38 at one end abutting an end follower plate 39, having a nut 40 at the opposite end abutting an end follower plate 41. The end plate 39 is limited in its movement to one direction by a lug or flange 42 on the casing, while the end plate 41 is limited in its movement at the opposite end by a lug 43. The flange or lug 42 is provided with an opening 42a through which the nut 38 may pass, while the lug or plate 43 is provided with an opening 43a through which the nut 40 may pass. An operative connection is provided betweeen the rods 20 and 37 by means of a lever 44 fulcrumed on a pin 45 mounted in a lug 46 on the casing H, the shorter arm of the lever normally abutting the end of the rod 20 on the nut 32, the latter being conveniently in the form of a cap nut. It will be seen that the nut 32 on the rod 20 engaging the lever 44, the lever will turn on its fulcrum moving the rod 37 the end of which, or the cap nut 40 on it, engages the longer arm of the lever. As the movement of the rod 37 is controlled by the longer arm of the lever it will be seen that there will be substantially greater compression of the element 33 than of the elements 21 and 22, thus providing increased resistance to buffing shocks.

In some cases it is found that the buffing shock will cause the head 47 of the coupler to engage the end of the casing, and I provide a resistance for this by mounting rubber springs 48 and 49 on opposite sides of a plate 50a within a casing 51a connected to the ends of the housing, the springs 49 engaging a buffing plate 52 which projects through an opening in the casing 51a, and is designed to engage the head 47 when it moves inwardly beyond a certain distance.

The alternative form shown in Figures 5, 6 and 7 differs from that shown in the other figures in that both shock resisting elements will afford resistance to both pulling and buffing. This is accomplished by forming a suitable connection between the rods 20 and 37 which will cause them to operate together in both directions. A convenient way of doing this is by providing the connecting lever 44a with bifurcated ends 44b and 44c which fit within grooves 32a and 40a on modified cap nuts 40b and 32b. This device works as already described except that under pulling strain the cap nut 32b will engage and move the end of the lever 44a, thus moving the rod 37 and causing the springs in the lower part of the housing to also resist the pulling strain.

It will be seen that by the foregoing construction a very light two wheel truck is provided, and it is intended that two of such trucks should be used to support a car body of convenient design, the forward truck being connected to the rear truck by a connecting rod such as G, the forward end of which will have a corresponding swivelling connection with the forward truck. The mounting of the car axle housing and of the car wheel axle therein is the same as shown and claimed in my co-pending application Serial No. 2,272 filed January 17, 1935.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim is:

1. In a car truck, a housing having two cylindrical sections mounted one above the other, with an opening at one end between the same, a reciprocably mounted coupling element in the upper section, resilient means in the lower section resisting such movement of the element, a lever mounted in the housing fulcrumed intermediate of its length, having one end connected to the coupling element and the opposite end connected to the resilient means.

2. In a car truck, a coupling element having a rod, resilient shock resisting means operatively connected to the rod, a second rod, resilient shock resisting means operatively connected to the second rod and means pivotally connected intermediate its ends to said truck and operatively connecting the two rods in such a way as to combine the resistance of the shock resisting means to absorb and resist both buffing and pulling forces.

3. In a truck housing having two compartments, a shock absorbing element in one compartment and a shock resisting element in the other, a pair of reciprocable connecting rods, one extending in one compartment through the shock absorbing element and operatively connected thereto and the other extending in the other compartment through the shock resisting element and operatively connected thereto, said rods projecting from the ends of said elements, a coupling element connected to the end of one rod and a lever connected to the opposite end of said rod, said lever being fulcrumed on the housing intermediate of its length and having one end connected to the rod engaging the shock resisting element whereby said shock absorbing element receives the preliminary shock, the resistance of said shock absorbing element being reinforced by the shock resisting element to an increasing degree.

4. In a car truck, a housing having two cylindrical sections positioned in adjacent relation with one another, resilient means positioned in both of said sections respectively, a reciprocating rod extending through and associated with each resilient means, a coupler pivotally connected to one of the rods and adapted to energize one of the resilient means, a lever pivotally connected intermediate its ends to the housing, said lever having the ends thereof associated with both of said rods for transmitting buffing shocks from the coupler to the other resilient means.

5. In a car truck, a bolster substantially of T-shape in plan comprising a stem portion having two cylindrical sections positioned in adjacent relation with one another, resilient means positioned in both of said sections respectively, a reciprocating rod extending through and associated with each resilient means, a coupler pivotally connected to one of the rods and adapted to energize one of the resilient means, and a lever pivotally connected intermediate its ends to the stem portion, said lever extending through an aperture in said stem portion and having the ends thereof associated with both of said rods for transmitting buffing and draft shocks from the coupler to the other resilient means.

6. In a car truck, in combination, a housing having two cylindrical sections positioned adjacent one another, a coupler stem, a coupler rod pivotally connected to the coupler stem, said coupler stem and coupler rod extending into one of the sections, resilient means in the other section, a reciprocating rod associated with said resilient means, a lever pivotally connected intermediate its ends to the housing and extending through an aperture therein, said lever having its ends associated with the coupler rod and reciprocating rod respectively, and an arm of the lever from the pivotal connection to the coupler rod being of a length less than an arm of the lever from the said pivotal connection to the reciprocating rod.

JOSEPH ASHMORE CAMERON.